United States Patent Office 3,822,276
Patented July 2, 1974

3,822,276
CERTAIN PYRIDYL ACYLAMIDES
Alex Meisels, Basel, and Emilio Schott, Riehen, Switzerland, assignors to Ciba-Geigy Corporation, Ardsley, N.Y.
No Drawing. Application June 9, 1969, Ser. No. 834,596, now Patent No. 3,555,035, which is a continuation of application Ser. No. 610,804, Jan. 23, 1967, which in turn is a continuation-in-part of application Ser. No. 474,167, July 22, 1965, both now abandoned. Divided and this application Sept. 3, 1970, Ser. No. 69,428
Claims priority, application Switzerland, July 31, 1964, 10,068/64; July 2, 1965, 9,322/65
The portion of the term of the patent subsequent to Feb. 2, 1999, has been disclaimed
Int. Cl. C07d 31/44
U.S. Cl. 260—295 AM    3 Claims

ABSTRACT OF THE DISCLOSURE

The compounds are of the class of unsaturated fatty acid pyridyl amides which possess antiviral and tumor growth inhibiting properties. Illustrative examples of such compounds are N-(5-methyl-2-pyridyl)-linolamide and N-(5-methyl-2-pyridyl)-linolenamide.

CROSS REFERENCE TO RELATED APPLICATIONS

This application is a division of Ser. No. 834,596, filed June 9, 1969, now U.S. Pat. No. 3,555,035, which in turn is a continuation of Ser. No. 610,804, filed Jan. 23, 1967, which in turn is a continuation-in-part of Ser. No. 474,167, filed July 22, 1965, both now abandoned.

DETAILED DISCLOSURE

This invention relates to new amides of unsaturated fatty acids as well as processes for their production.

Particularly, the invention concerns amides of the formula

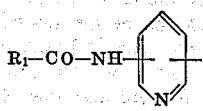

(I)

wherein $R_1$—CO— represents the acyl radical of linoleic acid or of α-linolenic acid, and $R_2$ represents, in p-position to the amido group, bromo, iodo, lower alkyl, lower alkoxy, lower alkenyloxy, lower alkylthio, lower alkenylthio, lower alkanoylamino, lower akoxycarbonyl, or carbamyl.

The terms lower alkyl, and derivations thereof using the root "alk" embrace hydrocarbon chains having one through three carbon atoms.

A preferred subclass of compounds are those compounds of Formula I wherein $R_1$—CO— is in the 2- or 3-position of the pyridine ring and represents the acyl radical of linoleic acid.

A third preferred subclass of compounds are those compounds of Formula I wherein $R_1$—CO— is in the 2-position and $R_2$ represents in (p-position to the amido group lower alkyl or lower alkoxycarbonyl.

A combination of excellent properties make the compounds of the invention valuable for pharmacological uses. It was found that the compounds of the invention inhibit the growth of a variety of tumors in mammals and that some of the compounds protect mammals against harmful effects of Herpes simplex virus infections. The usefulness of the compounds of the invention is further enhanced by the favorable ratio between the significantly active and the maximal tolerated dosages.

As antiviral agents, especially, in the treatment of infections with Herpes simplex virus there are useful those compounds falling under Formula I in which the pyridyl ring bears bromo or iodo as substituent $R_2$.

The tumor growth-inhibiting activity of the compounds falling under Formula I, including those in which $R_2$ is iodo, was determined in animal tests on subcutaneous or oral administration in cases of transplanted Ehrlich carcinoma, sarcoma induced by methylcholanthrene (MC sarcoma), skin carcinoma induced by dimethylbenzanthracene (DMBA carcinoma) in the mouse and of spontaneous mammary carcinoma. These tests were performed using five animals per dosage and ten as controls. The active ingredients were administered in the case of Ehrlich carcinoma on four, and in cases of induced and spontaneous tumors on eight consecutive days in dosages which were at most ¼ or ⅛, respectively, of the Dosis tolerata maxima (Dtm.). The size of the Ehrlich carcinoma was determined on the sixth, that of the induced tumors on the first day after conclusion of the test by measuring the cross section and that of the spontaneous mammary carcinoma twenty days after the first application.

The tumor growth-inhibiting effect of compounds of Formula I was determined by comparing the reduced diameter and/or the weight of the tumors in the test animals with those in the controls and is expressed in percent.

A representative number of the compounds of the invention were found to be significantly active in these tests. Unexpectedly they were more active than the unsubstituted parent substance N-(2-pyridyl)-linolamide, which compound is known and was described by F. Zetzsche Ber., 71, 1516–1521 (1938).

Table I lists the results obtained with the particularly active compounds of the invention and of the known compound.

TABLE I

| Compound tested | Type of tumor | Dosage in mg./kg. | Inhibition of tumor growth in percent |
|---|---|---|---|
| N-(5-methyl-2-pyridyl-)-linolamide. | Ehrlich Carcinoma. | 4×1,250 s.c.<br>4×625 s.c.<br>4×312.5 s.c.<br>4×1,250 p.o.<br>4×625 p.o. | ca. 25<br>ca. 25<br>ca. 25<br>ca. 25<br>11–25 |
|  | MC Sarcoma. | 8×625 s.c. | 51–75 |
|  | DMBA Carcinoma. | 8×625 s.c.<br>8×312.5 s.c.<br>8×312.5 p.o. | ca. 75<br>ca. 50<br>75–99 |
|  | Spont. mammary Ca. | 8×625 s.c.<br>8×31.25 s.c.<br>8×625 p.o.<br>8×31.25 p.o. | 11–25<br>11–50<br>26–50<br>51–75 |
| N-(6-methoxy-3-pyridyl)-linolamide. | DMBA Carcinoma. | 8×625 s.c. | 26–50 |
| N-(6-acetylamino-3-pyridyl)-linolamide. | DMBA Carcinoma. | 8×625 s.c.<br>8×625 p.o.<br>8×312 p.o. | 75–99<br>11–25<br>51–99 |
| N-(6-methylmercapto-3-pyridyl)-linolamide. | MC Sarcoma. | 8×625 s.c. | 26–50 |
| N-(6-allylmercapto-3-pyridyl)-linolamide. | Spont. mammary Ca. | 8×625 s.c. | 26–50 |
| N-(5-carbamyl-2-pyridyl)-linolamide. | Spont. mammary Ca. | 10×312 s.c. | 51–75 |
| N-5(ethoxycarbonyl-2-pyridyl)-linolamide. | MC Sarcoma. | 10×625 p.o.<br>10×312 p.o. | 25–50<br>26–50 |
|  | DMBA Carcinoma. | 10×625 s.c.<br>10×312 s.c.<br>10×156 s.c.<br>8×625 p.o.<br>8×312 p.o.<br>8×250 p.o.<br>8×156 p.o. | ca. 99<br>26–80<br>75–99<br>ca. 99<br>26–50<br>51–75<br>75–99 |
|  | Spont. mammary Ca. | 10×500 s.c.<br>8×500 p.o.<br>8×250 p.o.<br>8×125 p.o. | 62–50<br>51–75<br>ca. 50<br>26–50 |

TABLE I—Continued

| Compound tested | Type of tumor | Dosage in mg./kg. | Inhibition of tumor growth in percent |
|---|---|---|---|
| N-(5-methoxycarbonyl-2-pyridyl)-linolamide. | DMBA Carcinoma. | 10×625 s.c. | 51-75 |
| | | 10×625 p.o. | 26-75 |
| | Spont. mammary Ca. | 10×625 s.c. | 75-99 |
| | | 10×250 s.c. | 51-75 |
| | | 10×500 s.c. | 26-50 |
| | | 10×250 p.o. | 11-25 |
| N-(5-isopropoxycarbonyl-2-pyridyl)-linolamide. | DMBA Carcinoma. | 10×625 s.c. | 75-99 |
| N-(5-methyl-2-pyridyl)-linolenamide. | Ehrlich Carcinoma. | 4×1,250 s.c. | 11-25 |
| | | 4×1,250 p.o. | 26-50 |
| | | 4×625 p.o. | 11-25 |
| | MC Sarcoma. | 8×1,250 p.o. | 51-75 |
| | | 8×625 p.o. | 26-50 |
| N-(5-iodo-2-pyridyl)-linolenamide. | MC Sarcoma. | 8×625 s.c. | 26-50 |
| | | 8×625 p.o. | 11-25 |
| | DMBA Carcinoma. | 8×625 s.c. | 26-50 |
| | | 8×625 p.o. | ca. 50 |
| | | 8×312 p.o. | 26-50 |
| N-(2-pyridyl)-linolamide (known compound). | Ehrlich Carcinoma. | 4×1,250 s.c. | 0 |
| | | 4×1,250 p.o. | 0 |
| | MC Sarcoma. | 8×625 s.c. | ca. 25 |
| | | 8×625 p.o. | ca. 15 |
| | DMBA Carcinoma | 8×625 s.c. | ca. 15 |
| | | 8×625 p.o. | |

The maximal tolerated dose as determined in mice with one single subcutaneous administration and an observation period of 10 days is higher than 5000 mg./kg. for each test compound described in Table I.

The antiviral activity of the compound of Formula I wherein $R_2$ is bromo or iodo is demonstrated in mice of the albino strain "Swiss." Five animals are used per dosage and at least twice the amount are used as controls. The active compounds are administered subcutaneously or orally as solution in sesame oil, on four consecutive days. The first administration is given 30 min. before infection with the $LD_{80}$ of a Herpes simplex virus/HO preparation.

The prolongation of the mean survival time of the test group in percent of the controls is a criterion for effectiveness.

Table 2 shows the activity of various dosages of two representative compounds.

TABLE 2

| Compound tested | Type of virus | Dosage in mg./kg. | Prolongation of survival time in percent |
|---|---|---|---|
| N-(5-bromo-2-pyridyl)-linolamide. | Herpes simplex/HO. | 4×1250 s.c. | 26-50 |
| | | 4×625 s.c. | 26-75 |
| | | 4×1250 p.o. | 11-25 |
| N-(5-bromo-2-pyridyl)-linolenamide. | Herpes simplex/HO. | 4×1250 s.c. | 11-25 |
| | | 4×625 s.c. | 11-50 |
| | | 4×1250 p.o. | 11-25 |
| | | 4×625 p.o. | 75-99 |

The maximal tolerated dose determined in mice by one single subcutaneous administration and an observation period of 10 days is higher than 5000 mg./kg. for both test compounds described in Table 2.

The new amides of Formula I are produced by reacting an acid of the formula $$R_1—CO—OH \qquad (II)$$

wherein $R_1$—CO— has the meaning given above, or a reactive functional derivative of such acid with a nuclear substituted aminopyridine of the formula

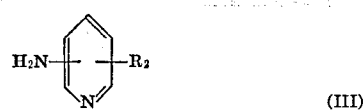

(III)

wherein $R_2$ has the meaning given above, or with a reactive functional derivative thereof, in the presence of a carbodiimide such as dicyclohexyl carbodiimide, in an inert solvent such as tetrahydrofuran.

On heating lower alkyl esters such as the methyl or ethyl ester of the acids of Formula II and also the amides with compounds of Formula III, the corresponding, substituted amides of Formula I are obtained. Other suitable reactive functional derivatives of acids of Formula II are the halides and anhydrides, particularly the anhydrides mixed with carbonic acid semi esters. These functional derivatives are reacted with a compound of Formula III, preferably in the presence of an acid binding agent, e.g. a strong tertiary organic base such as triethylamine, pyridine or s-collidine, which can also serve in excess as reaction medium, or they are reacted in the presence of an excess of the reaction component of Formula III in the presence or absence of an inert organic solvent such as benzene, tetrahydrofuran or dimethyl formamide.

Examples of alkylaminopyridines of Formula III are 2-amino-5-chloro-pyridine,
3-amino-6-fluoro-pyridine,
2-amino-5-iodo-pyridine,
2-amino-5-bromo-pyridine,
3-amino-6-chloropyridine,
3-amino-6-methyl-pyridine,
2-amino-5-methyl-pyridine,
2-amino-5-ethyl-pyridine,
2-amino-5-n-propyl-pyridine,
2-amino-5-isopropyl-pyridine,
3-amino-6-propionyl-pyridine,
3-amino-6-methoxy-pyridine,
3-amino-6-ethoxy-pyridine,
3-amino-6-allyloxy-pyridine,
3-amino-6-methylmercapto-pyridine,
3-amino-6-ethylmercapto-pyridine,
3-amino-6-allylmercapto-pyridine,
3-amino-6-acetylamino-pyridine,
2-amino-5-methoxycarbonyl-pyridine,
2-amino-5-ethoxycarbonyl-pyridine,
2-amino-5-isopropoxycarbonyl-pyridine, and
2-amino-5-carbamyl-pyridine.

As modification of the reaction of acid halides with compounds of Formula III in the presence of acid binding agents, the reaction can be mentioned of the acid halides with suitable tertiary organic bases, particularly triethylamine, in an inert organic solvent, removal by filtration of the hydrochloride formed and reaction of the ketene or ketene dimer present in the solution with the desired compound of Formula III. Reactive esters of acids of Formula II which can reacted with compounds of Formula III in inert organic solvents, if necessary with heating, are, e.g. their p-nitrophenyl esters and cyanomethyl esters. The 1-imidazolides of the acids mentioned are reacted with compounds of Formula III under similar conditions.

The isocyanates and isothiocyanates derived from compounds of Formula III are mentioned as reactive functional derivatives of compounds of Formula III which can be reacted directly with acids of Formula II. These are heated with the acids of Formula II until the equimolar amount of carbon dioxide or carbon oxysulfide has been liberated.

The reactions with isocyanates and isothiocyanates can be performed in the presence or absence of an inert organic solvent having a sufficiently high boiling point or range. Instead of isocyanates, also preliminary stages thereof can be used. In particular the azides of pyridine carboxylic acids substituted corresponding to the definition for $R_2$ can be reacted with acids of Formula II with heating in suitable inert organic solvents. In addition, N-chlorocarbonyl derivatives of compounds of Formula III, are reacted with salts, e.g. alkali metal salts, of acids of Formula II in the presence or absence of inert organic solvents and the reaction mixtures are heated until the equimolar amount of carbon dioxide has been liberated from the carboxylic acid-carbamic acid anhydrides first formed.

Other reactive functional derivatives of compounds of Formula III are, e.g. the N-trimethylsilyl derivatives of which the trimethylsilylamino-pyridine carboxylic acid amides ($R_2=CONH_2$) are examples. They are obtained by reacting these amines with trimethylsilyl chloride in inert, anhydrous organic solvents. The N-trimethylsilyl derivatives are reacted with reactive functional derivatives of acids of Formula II in inert organic solvents to form N-trimethylsilyl derivatives of amides of Formula I, from which, on decomposing them with water or lower alkanols, the desired amides are formed.

Another type of reactive derivatives of compounds of Formula III are the N,N'-dipyridyl-carbodiimides substituted in both the pyridine rings corresponding to the definition of $R_2$. These are obtained, for example, by heating the corresponding, substituted N,N'-dipyridyl thioureas with lead-(II)-oxide in anhydrous toluene while gradually distilling off the solvent. On heating these carbodiimides with acids of Formula II in a stream of carbon dioxide at temperatures around 200°, the amides desired of Formula I are obtained.

Instead of acids of Formula II or their reactive functional derivatives, if desired the saturated bromine addition products of these acids or of reactive functional derivative thereof can be reacted with nuclear substituted aminopyridines or nuclear substituted alkylaminopyridines of Formula III or with reactive functional derivatives thereof and the amides of polybromine fatty acids having 18 carbon atoms so obtained can be debrominated in the known way.

The functional derivatives of both reaction components and also the reaction conditions for amide formation are substantially those given above for the direct production of compounds of Formula I. Debromination is performed, for example, by boiling the intermediate products with zinc in ethanol. As the bromine addition products of acids of Formula I are often produced, e.g. in the case of linoleic acid and linolenic acid, during their isolation from natural mixtures of fatty acids and, after purification, again have to be debrominated, the above modification of the process starting from crude acid mixtures necessitates no extra steps in the reaction but is only a change in the order of the steps.

If desired, compounds of Formula I produced by one of the processes given above, are converted into another compounds of this formula. In particular, compounds of Formula I containing a nitro group as radical $R_2$ are reduced, if desired, into corresponding compounds having an amino group as radical $R_2$. The same is also true of the corresponding, substituted polybromine fatty acid amides, i.e. the conversion of the nitro group into the amino groups can also be introduced between the amide formation and the debromination in the second process mentioned. The nitro group is reduced to the amino group, for example, by means of hydrogen in the presence of a noble metal catalyst such as, e.g. palladium on calcium carbonate, at room temperature and normal pressure in an organic solvent such as ethanol. The reduction is interrupted after about three times the molar amount of hydrogen has been taken up.

Finally the amides of Formula I containing an amino group as radical $R_2$, or the corresponding, substituted polybromine fatty acid amides can be acylated to the corresponding amides containing an alkanoylamino group. The acylation is performed, for example, by treatment with a lower alkanoic acid halide or anhydride, if necessary in the presence of an acid binding agent such as pyridine, or an alkali carbonate, in an organic solvent or in the presence of sodium hydroxide solution in a two-phase organic-aqueous system. The acetyl radical is introduced, for example, by boiling a primary reaction product having a free amino group in excess acetanhydride. The amides to be acylated of Formula I containing the amino group as radical $R_2$ are obtained in their turn, for example, by the reductions of amides mentioned in the previous paragraph of Formula I which, in the corresponding position, contain the nitro group. The same is true of the corresponding polybromine fatty acids amides.

Daily dosages of amides of Formula I for the treatment of virus diseases and for inhibiting growth of tumors are, for mammals about 2 to 100 mg. per kg. of body weight; however, according to the high dosis tolerata maxima also higher doses may be used. Within these margins the dosages for parenteral administration are in general lower than those for oral administration. These daily dosages are advantageously administered in dosage units containing 5 to 250 mg. of active substance but corresponding amounts in forms not expressly suitable for single doses such as syrups, sprays, aerosols, powders and ointments can be used.

Dosage units for oral administration preferably contain between 1% and 90% of an amide of Formula I or of a non-toxic salt thereof as active ingredient. They are produced by combining the active substance, for example, with solid pulverulent carriers such as lactose, saccharose, sorbitol, mannitol; starches such as potato starch, corn starch or amylopectin, also laminaria powder or citrus pulp powder; cellulose derivatives of gelatines, optionally with the addition of lubricants such as magnesium or calcium stearate or polyethylene glycols (Carbowaxes) of suitable molecular weights, to form tablets or dragée cores. The latter are coated, for example with concentrated sugar solutions which can also contain, e.g. gum arabic, talcum and/or titanium dioxide, or with a lacquer dissolved in easily volatile organic solvents or in mixtures of solvents. Dyestuffs can be added to these coatings, for example, to distinguish between different dosages of active substance.

Dosage units for the rectal application are, e.g. suppositories which consist of a combination of an active substance or of a suitable salt thereof with a neutral fatty foundation or also gelatine rectal capsules which contain a combination of the active substance or a suitable salt thereof with polyethylene glycols (Carbowaxes) of suitable molecular weight.

Other forms for the treatment of virus infections of the air passages are syrups and also aerosols and, for the local treatment of virus diseases, ointments and powders are used. All these forms can be prepared by pharmaceutically acceptable carriers, diluents and/or additives, conventional for these purposes.

The following examples will serve to further illustrate the production of the compounds of the invention as well as the production of pharmaceutical application forms but should not be construed as a limitation on the scope of the invention.

EXAMPLE 1

N-(5-Chloro-2-pyridyl)-linolamide 2.57 g. (0.02 mol) of 2-amino-5-chloropyridine and 2.22 g. (0.022 mol) of triethylamine are dissolved in 100 ml. of benzene. 6 g. (0.02 mol) of linoleoyl chloride (9,12-octadienoyl chloride), dissolved in 30 ml. of benzene, are added dropwise within 10 minutes while stirring and cooling with ice water and the mixture is stirred for another 2 hours at room temperature. Precipitated triethylamine hydrochloride is separated by suction filtration and washed with hot benzene; the washing is combined with the filtrate.

To the filtrate which contains the desired N-(5-chloro-2-pyridyl)-linolamide, there are added as stabilizer 4 mg. of dodecyl gallate and 4 mg. of [D,L]-α-tocopherol, benzene is then evaporated from the filtrate; the resulting oily crude product (7.8 g.) is dissolved in low boiling petroleum ether (40–60°) and chromatographed on alumina (activity III, according to Brockmann).

The alumina is eluted successively with petroleum ether (40–60°), petroleum ether/benzene and with benzene and the resulting fractions are tested by thin-layer chromatography (according to Stahl, silica gel G, solvent: acetone/hexane 1:4, development: phosphomolybdic acid 20% in alcohol, for the presence of N-(5-chloro-2-pyridyl)-linolamide ($R_f$ value: 0.7)).

The fractions containing pure N-(5-chloro-2-pyridyl)-linolamide are combined and concentrated to an oil which slowly crystallizes at 20°. The crystals have a melting point of 28°.

Fractions containing the impure product are combined, concentrated, and again chromatographed (Alox III, 150 g.).

The fractions containing pure N-(5-chloro-2-pyridyl)-linolamide which result from this second chromatography are indentified as described above, combined and concentrated.

The following compounds are obtained in an analogous manner from the corresponding starting materials:

|  | M.P., degrees |
|---|---|
| N-(6-fluoro-3-pyridyl)-linolamide | 30 |
| N-(5-iodo-2-pyridyl)-linolamide | 51 |
| N-(6-chloro-3-pyridyl)-linolamide | 48 |
| N-(6-methyl-3-pyridyl)-linolamide | 23 |
| N-(6-acetylamino-3-pyridyl)-linolamide | 128 |

The production of N-(6-acetylamino-3-pyridyl)-linolamide is performed in tetrahydrofuran. The product is recrystallized from ethanol.

EXAMPLE 2

N-(5-methyl-2-pyridyl)-linolamide 4.32 g. of (0.04 mol) of 2-amino-5-methylpyridine are dissolved in 100 ml. of benzene. 6.0 g. (0.02 mol) of linoleoyl chloride in 30 ml. of benzene are added dropwise within 10 minutes while stirring and cooling (ice water) and the mixture is stirred for another 2 hours at room temperature. Precipitated 2-amino-5-methylpyridine hydrochloride is filtered off under suction and washed with hot benzene. The washings are combined with the filtrate which contains the desired product.

After addition of a stabilizer analogously to Example 1 the filtrate is evaporated in vacuo and to the resulting crude product there are added 50 g. of urea, dissolved in 150 ml. of hot methanol. The precipitated crystals of the urea adduct thus formed are filtered off under suction 12 hours later, washed with 10 ml. of cold ether and recrystallized from methanol. They are composed of 3 parts by weight of urea and 1.1 part by weight of N-(5-methyl-2-pyridyl)-linolamide. In order to decompose this complex, 10 g. of the urea adduct are added to 100 ml. of water. The resulting oil N-(5-methyl - 2 - pyridyl)-linolamide, is extracted with petroleum ether. After evaporating the solvent in vacuo, there is obtained the purified N-(5-methyl-2-pyridyl)-linolamide, M.P. 16°.

The crude N-(5-methyl-2-pyridyl)-linolamide can also be purified by centrifugal molecular distillation.

In an analogous manner is obtained: N-(6-methoxy-3-pyridyl)-linolamide, M.P. 28° via the respective urea adducts, the weight ratio of urea to the respective linolamide being about 3:1.

EXAMPLE 3

N-(5-nitro-2-pyridyl)-linolamide 5.56 g. (0.04 mol) of 2-amino-5-nitropyridine are dissolved in 200 ml of pyridine. 12 g. (0.04 mol) of linoleoyl chloride are added dropwise while stirring and cooling (ice water) and the mixture is stirred for 6 hours at room temperature. The precipitated pyridine hydrochloride is filtered off under suction and the pyridine is removed in vacuo at 45° (11 Torr). The residue is purified by columnar chromatography analogously to Example 1, M.P. 38°.

The following compounds are obtained in an analogous manner from the corresponding starting materials:

N-(6-propoxy-3-pyridyl)-linolamide, M.P. 41°,
N-(6-ethoxy-3-pyridyl)-linolamide, M.P. 39°,
N-(5-bromo-2-pyridyl)-linolamide, M.P. 45°,
N-(5-ethyl-2-pyridyl)-linolamide, $n_D^{28°}$: 1.5169,
N-(6-methylmercapto-3-pyridyl)-linolamide, M.P. 48°,
N-(6-allylmercapto-3-pyridyl)-linolamide, M.P. 30°,
N-(5-ethoxycarbonyl-2-pyridyl)-linolamide, M.P. 34°.

EXAMPLE 4

N-(5-chloro-2-pyridyl)-linolenamide 2.57 g. (0.02 mol) of 2-amino-5-chloropyridine and 2.22 g. (0.22 mol) of triethylamine are dissolved in 100 ml. of benzene. 6 g. (0.02 mol) of linolenoyl chloride in 30 ml. of benzene are added dropwise within 10 minutes, the addition being made while stirring and cooling (ice water) in an atmosphere of nitrogen, after which the mixture is stirred for 2 hours at room temperature. The reaction product is worked up and purified analogously to Example 1. $n_D^{28°}$ 1.5251.

The following compounds can be produced in an analogous manner from the corresponding starting materials:

N-(6-chloro-3-pyridyl)-linolenamide, M.P. 39°,
N-(5-bromo-2-pyridyl)-linolenamide, M.P. 42°,
N-(5-iodo-2-pyridyl)-linolenamide, M.P. 52°,
N-(6-methyl-2-pyridyl)-linolenamide, $n_D^{28°}$ 1.5236,
N-(6-methyl-3-pyridyl)-linolenamide, M.P. 28°,
N-(6-fluoro-3-pyridyl)-linolenamide, M.P. 28°.

EXAMPLE 5

N-(5-methyl-2-pyridyl)-linolenamide 4.32 g. (0.04 mol) of 2-amino-5-methylpyridine are dissolved in 100 ml. of benzene, 6 g. (0.02 mol) of linolenoyl chloride dissolved in 30 ml. of benzene are added dropwise, the addition being made while stirring and cooling (ice water) in a stream of nitrogen. After stirring for 2 hours at room temperature, the reaction product is worked up and purified analogously to Example 2. M.P. 31°.

The following compounds are obtained in an analogous manner from the corresponding starting materials: N-(6-methoxy-3-pyridyl)-linolenamide, M.P. 28°.

EXAMPLE 6

N-(5-nitro-2-pyridyl)-linolenamide 5.56 g. (0.04 mol) of 2-amino-5-nitropyridine are dissolved in 200 ml. of pyridine. 12 g. (0.04 mol) of linolenoyl chloride are added dropwise in a stream of nitrogen while stirring and cooling (ice water) and then the reaction mixture is stirred for 6 hours at room temperature. It is worked up analogously to Example 6 and N-(5-nitro-2-pyridyl)-linolenamide is isolated. M.P. 42°.

The following compounds are obtained in an analogous way from the corresponding starting materials.

N-(6-ethoxy-3-pyridyl)-linolenamide, M.P. 42°,
N-(6-allyloxy-3-pyridyl)-linolenamide, M.P. 37°,
N-(6-propoxy-3-pyridyl)-linolenamide, M.P. 38°,
N-(5-ethyl-2-pyridyl)-linolenamide, $n_D^{28°}$ 1.5258.

EXAMPLE 7

N-(5-methyl-2-pyridyl)-linolamide (a) A solution of 8.24 g. (0.04 mol) of N,N'-dicyclohexyl carbodiimide in 50 ml. of tetrahydrofuran is added dropwise at −10° to a solution of 11.2 g. (0.04 mol) of linoleic acid and 5.6 g. (0.04 mol) of p-nitrophenol in 100 ml. of tetrahydrofuran while stirring. After stirring for 1 hour at −10° and for 4 hours at room temperature, the precipitated N,N' - dicyclohexyl urea is filtered off under suction and washed with tetrahydrofuran and evaporated in vacuo. The linoleic acid-p-nitrophenyl ester obtained melts at 28°.

(b) 4.01 g. (0.01 mol) of linoleic acid-p-nitrophenyl ester and 10.8 g. (0.1 mol) of 2-amino-5-methylpyridine are left to stand in 50 ml. of chloroform for 4 days. After evaporating off the solvent, the crude product is purified by columnar chromatography analogously to Example 1. The product is identical with the N-(5-methyl-2-pyridyl)-linolamide produced according to Example 2.

EXAMPLE 8

N-(5-amino-2-pyridyl)-linolamide 4.01 g. (0.01 mol) of N-(5-nitro-2-pyridyl)-linolamide (for production see Example 6) are dissolved in 150 ml. of purified ethanol, 1.5 g. of Pd-CaCO$_3$ catalyst are added and the whole is hydrogenated at room temperature and normal pressure until 0.03 mol of hydrogen have been taken up (duration about 30 hours). The solution of the reaction product, after removal of the catalyst, is evaporated and the residue is recrystallized from methanol, M.P. 42°.

To prepare the hydrochloride of N-(5-amino-2-pyridyl)-linolamide the base is dissolved in ethanol and an ethereal solution of hydrochloric acid is added at 0°. The precipitate is filtered off and recrystallized from ethanol-ether, M.P. 87°.

EXAMPLE 9

N-(5-amino-2-pyridyl)-linolenamide 4.01 g. (0.01 mol) of N-(5-nitro-2-pyridyl)-linolenamide (for production see Example 9) are dissolved in 150 ml. of distilled purified ethanol, 1.5 g. of Pd-CaCO$_3$ are added and the whole is hydrogenated for 30 hours at room temperature and normal pressure. The reaction solution, after removal of the catalyst is evaporated in vacuo and the residue is recrystallized from methanol, M.P. 38°.

EXAMPLE 10

N-(5-bromo-2-pyridyl)-linolamide 2.22 g. (0.022 mol) of triethylamine are dissolved in 50 ml. of anhydrous ether. While stirring and cooling with ice water, 3 g. (0.01 mol) of linoleoyl chloride dissolved in 20 ml. of anhydrous ether are added dropwise within 5 minutes. Then 1.73 g. (0.01 mol) of 2-amino-5-bromo-pyridine dissolved in 50 ml. of ethyl acetate are added dropwise within 10 minutes and the mixture is stirred for another 2 hours.

The precipitated triethylamine hydrochloride is filtered off under suction and washed with hot benzene. N-(5-bromo-2-pyridyl)-linolamide is obtained from the filtrate analogously to Example 1 by chromatography on an alumina column, M.P. 45°.

EXAMPLE 11

N-(5-bromo-2-pyridyl)-linolamide 2.79 g. (0.01 mol) of linolamide and 1.75 g. (0.01 mol) of 2-amino-bromo-pyridine are heated for 2 hours at 220° while stirring in a stream of nitrogen. After cooling, the N-(5-bromo-2-pyridyl)-linolamide is purified by chromatography on an alumina column analogously to Example 1, M.P. 45°.

EXAMPLE 12

N-(5-carbamyl-2-pyridyl)-inolamide 6.85 g. (0.05 mol) of 6-amino-nicotine amide are dissolved in 100 ml. of dimethyl formamide and 5.05 g. (0.05 mol) of triethylamine. While stirring and cooling with ice water, 5.43 g. (0.05 mol) of trimethyl silyl chloride, dissolved in 30 ml. of dimethyl formamide are added dropwise within 10 minutes and the mixture is stirred for another 2 hours at room temperature. While stirring and cooling with ice water, 5.55 g. (0.055 mol) of triethylamine and then 15.0 g. (0.05 mol) of linoleoyl chloride, dissolved in 30 ml. of dimethyl formamide, are added dropwise and the mixture is stirred for another 2 hours. The reaction mixture is poured into 800 ml. of ice water, the precipitated product is filtered off under suction and dried under high vacuum (4 hours at 40°, about 1 Torr). The oil is then dissolved in 100 ml. of chloroform and the solution is chromatographed on 300 g. of alumina (activity III, according to Brockmann). The fractions eluted with chloroform, chloroform/methanol and methanol are tested by thin layer chromatography (according to Stahl, silica gel G, solvent chloroform/methanol 20:1, development: phosphorus molybdic acid 20% in ethanol). The fractions containing pure N-(5-carbamyl-2-pyridyl)-linolamide are combined, evaporated in vacuo and the residue recrystallized from methanol/ether, M.P. 142°.

EXAMPLE 13

N-(5-methyl-2-pyridyl)-linolamide 1.62 g. of 1,1'-carbonyl diimidazole are added at room temperature to 2.80 g. (0.01 mol) of linoleic acid dissolved in 25 ml. of anhydrous tetrahydrofuran.

On completion of the carbon dioxide development, 1.06 g. (0.01 mol) of 2-amino-5-methyl-pyridine dissolved in 20 ml. of anhydrous tetrahydrofuran are added and the reaction mixture is refluxed for 10 minutes. The residue obtained on evaporating the tetrahydrofuran off in vacuo is taken up in 50 ml. of ether and extracted with 50 ml. of water. The ethereal solution is concentrated and the N-(5-methyl-2-pyridyl)-linolamide is purified by chromatography on an alumina column analogously to Example 1, M.P. 16°.

EXAMPLE 14

N-(6-methyl-3-pyridyl)-linolamide 1.48 g. (0.01 mol) of 6-methyl-nicotine azide and 2.8 g. (0.01 mol) of linoleic acid are dissolved in 10 ml. of xylene and the solution is heated until nitrogen and carbon dioxide are developed. The heat is quickly removed and, as soon as the violent carbon dioxide development has subsided, the reaction mixture is refluxed.

On evaporating off the solvent, the N-(6-methyl-3-pyridyl)-linolamide is purified by chromatography on an alumina column analogously to Example 1, M.P. 23°.

EXAMPLE 15

N-(5-acetylamino-2-pyridyl)-linolamide 3.71 g. (0.01 mol) of N-(5-amino-2-pyridyl)-linolamide are left to stand for 12 hours at room temperature in 10 ml. of pyridine and 10 ml. of acetanhydride. The reaction product is poured onto 150 g. of ice and the precipitated crystals of N-(5-acetylamino - 2 - pyridyl)-linolamide are filtered off under suction and recrystallized from methanol, M.P. 125°.

EXAMPLE 16

N-(5-amino-2-pyridyl)-linolamide 4.02 g. (0.01 mol) of N-(5-nitro-2-pyridyl)-linolamide are dissolved in a mixture of 30 ml. of water, 6 ml. of dioxan and 6 ml. of methanol. 10 g. of iron powder are added and the mixture is stirred for 30 minutes at 90–93° under an atmosphere of nitrogen. The reaction mixture is filtered hot and the filtrate is evaporated to dryness. The N-(5-amino-2-pyridyl)-linolamide is purified by chromatography on an alumina column analogously to Example 1 and it is recrystallized from hexane, M.P. 42°; hydrochloride, M.P. 87°.

EXAMPLE 17

250 g. of active ingredient according to the invention, are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance (hydrochloride). If desired, the tablets can be grooved to attain better adaptation of the dosage.

EXAMPLE 18

A granulate is produced from 250 g. of active ingredient according to the invention. 175.90 g. of lactose and the alcoholic solution of 10 g. of stearic acid. After drying, 56.60 g. of colloidal silicium dioxide, 165 g. of talcum, 20 g. of potato starch and 2.50 g. of magnesium stearate are mixed in and the mixture is pressed into 10,000 dragée cores. These are then coated with a concentrated syrup made of 502.28 g. of crystallized saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

What is claimed is:

1. A compound of the formula.

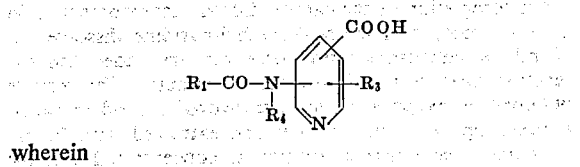

wherein $R_1$—CO— represents the linear acyl radical of an alkanoic acid, having 6–20 carbon atoms, alkenoic acid or alkapolyenoic acid, which linear acyl radical has from 6 to 18 carbon atoms, having 2 or 3 non-cumulated C—C double bonds, $R_3$ represents hydrogen, halogen or lower alkyl, and $R_4$ represents hydrogen or lower alkyl.

2. A compound of the formula

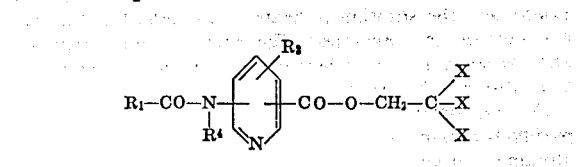

wherein

X represent halogen, $R_1$—CO— represents the linear acyl radical of an alkanoic acid, having 6–20 carbon atoms, alkenoic acid or alkapolyenoic acid, which linear acyl radical has from 6 to 18 carbon atoms, having 2 or 3 non-cumulated C—C double bonds, $R_3$ represents hydrogen, halogen or lower alkyl, and $R_4$ represents hydrogen or lower alkyl.

3. A compound of the formula

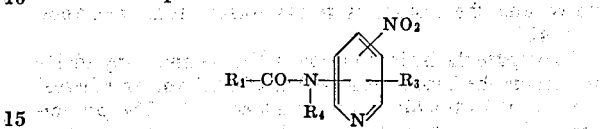

wherein $R_1$—CO— represents the linear acyl radical of a fatty acid of from 18 to 20 carbon atoms and containing at least 2 and at most 3 non-cumulated C—C double bonds, $R_3$ represents hydrogen, halogen or lower alkyl, and $R_4$ represents hydrogen or lower alkyl.

References Cited

UNITED STATES PATENTS 3,357,987   12/1967   Buck et al. _____ 260—295

ALAN L. ROTMAN, Primary Examiner

U.S. Cl. X.R.

260—295 CA, 295.5 C, 295.5 AM; 294.8 C; 424—266